United States Patent [19]

Guha et al.

[11] Patent Number: 4,587,280

[45] Date of Patent: May 6, 1986

[54] TANK TREAD PAD AND COMPOSITION FOR MAKING

[75] Inventors: Probir K. Guha, Mount Clemens; Kenneth A. Iseler, Richmond; Robert C. Yen, Troy, all of Mich.

[73] Assignee: Budd Company, Troy, Mich.

[21] Appl. No.: 472,357

[22] Filed: Mar. 4, 1983

[51] Int. Cl.$^4$ .................... B62D 55/205; C08K 7/02
[52] U.S. Cl. .................... 523/222; 524/539; 525/28; 525/440; 305/38; 305/51
[58] Field of Search .................... 523/222; 524/539; 525/440, 28, DIG. 931; 305/38, 51

[56] References Cited

U.S. PATENT DOCUMENTS

| | | | |
|---|---|---|---|
| 2,917,347 | 12/1959 | Reuter et al. | 305/38 |
| 2,917,348 | 12/1959 | Reuter et al. | 305/38 |
| 3,078,128 | 2/1963 | Speidel et al. | 305/38 |
| 3,859,381 | 1/1975 | Hutchinson | 525/440 |
| 3,868,431 | 2/1975 | Hutchinson | 525/440 |
| 4,302,553 | 11/1981 | Frisch et al. | 525/28 |

FOREIGN PATENT DOCUMENTS

| | | | |
|---|---|---|---|
| 2900683 | 7/1980 | Fed. Rep. of Germany | 305/51 |
| 1279673 | 6/1972 | United Kingdom | 525/28 |

*Primary Examiner*—Lewis T. Jacobs
*Attorney, Agent, or Firm*—Irvin L. Groh

[57] ABSTRACT

A tank tread pad and composition for making. A tank tread pad is formed from a polymeric material which is formed by an inter penetrating polymer network comprising a first urethane component and a second resinous component which cures under different conditions and is substantially unreactive with the urethane. A fibrous reinforcement is present in the cured resinous material.

9 Claims, 1 Drawing Figure

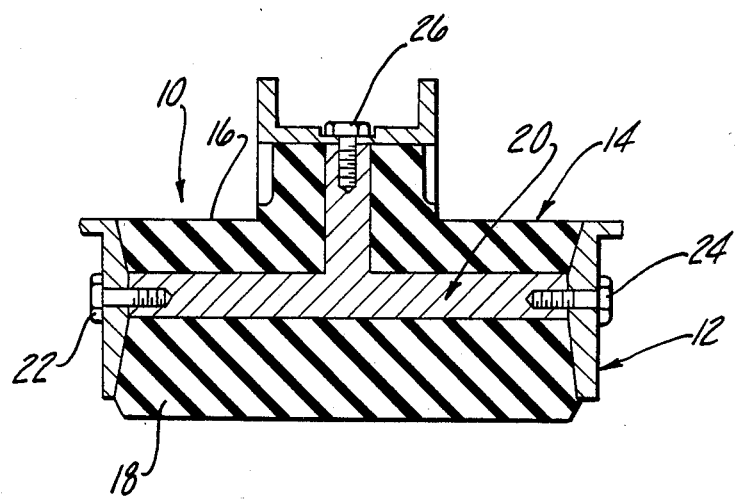

TANK TREAD PAD AND COMPOSITION FOR MAKING

In one aspect, this invention relates to track pads useful in track laying vehicles such as tanks and armored personnel carriers. In a further aspect, this invention relates to compounds useful for making pads for track laying devices. In yet a further aspect, this invention relates to resins which have high abrasion and tear resistance at elevated temperatures.

Track laying vehicles wherein a continuous track is constantly layed down in the direction of movement of the associated vehicle are well known. Examples of such track laying devices are the well known tanks and armored personnel carriers. Such devices have an endless track with a plurality of linked metal track shoes. For operating said devices on common asphalt or paved roads, it is desirable to fasten a resilient track pad on the continouus metal tread to cushion the effect of the vehicle and prevent the metal tread from coming into contact with the road's surface. The track pad is designed to protect both the tread and the road from the abrasion of a heavy vehicle moving over the road's surface. One example of a suitable track laying structure is disclosed in U.S. Pat. No. 3,078,128 issued Feb. 19, 1963 to the United States of America.

Because many track laying vehicles are of military importance, the materials used in forming the vehicles should be readily available within the country of the vehicles origin and in general the United States Government has required that materials used in their devices be available from sources within the United States to insure a continued supply of the necessary ingredients from sources and companies under U.S. direction.

While natural rubber makes a good track pad material, natural rubber is not available within the continental United States and therefore does not provide an acceptable material for defense purposes. Therefore, it was necessary to use synthetic rubbers. The material presently being used is styrene-butadiene elastomeric material known commonly as SBR or GRC rubber.

The desired life of a track pad is approximately 2,000 miles which allows the pads to be placed on the vehicle's track and run a substantial distance on paved roads without damaging the vehicle or roads. The constant movement of the heavy vehicle over the pad and the resulting compression results in a rapid heat buildup from ambient temperature to temperatures in the pad material of approximately 350° F. or more. The resulting temperature has a detrimental effect on SBR rubber and lowers its tear strength. As a result, the track pads are rapidly subject to tearing and chunks of pad rapidly fall away after a matter of only a few miles of continuous operation.

Basically, the desired track pad material will have temperature resistance to avoid breakdowns at temperatures achieved by the pad during operations on the order of approximately 350° F., tear resistance and abrasion resistance at such operating temperatures to avoid rapid deterioration of the pad and sufficient flexibility to provide a cushioning effect with respect to the vehicle and the road.

Briefly, it has been discovered that an improved track pad can be formed from resinous material having: a first urethane polymeric component cured by means of a aromatic curing agent; a second component of an inter penetrating network formed by a second cured resing chosen from a class of resins which react to form a separate phase; and the resulting inter penetrating polymer net work having a fiberous reinforcement.

A further understanding may be had by referring to the accompanying drawing in which:

The FIGURE illustrates a cross sectional view of a track showing an associated track pad made from the material of this invention.

The endless track is formed of track shoes 10 which are held together by linkages. An encircling band 12 which forms a part of the track shoe and is adapted to enclose a track pad 14 shown as a shaped member with an upper surface 16 which provides the wheel pad portion of the pad and the lower pad portion 18 which forms the road pad portion of the track pad 14. The track pad 14 has a T-shaped reinforcing bar 20 which is bonded to the pad 14. The track pad 14 is held in place by bolts 22, 24, and 25 which engage the T-shaped bar 20. An improved track pad 14 can be formed from the resins system as more fully described hereinafter. Of course, the material of this invention can be used to make tread pads of different configurations other than that illustrated.

Broadly stated, the urethane portion of the system of this invention comprises a polyol component, an isocyanate component and an aromatic co-curing agent with at least two active hydrogen sites. Examples of suitable polyol-materials which may be reacted with an organic diisocyanate or polyisocyanate, include polyalkyleneether glycols, polyalkylenearyleneether glycols, polyalkyleneetherthioether glycols, polyalkylenearyleneetherthioether glycols, polyester glycols, polyhydrocarbon glycols, etc. Polyalklyleneether glycols such as polytetramethyleneoxide glycols, alkyleneetherthioether glycols, such as thiodiethanol, and hydrocarbon glycols such as 1,4-butanediol, ethylene glycol, propylene glycol, 1,5-pentanediol, octylene glycol, 2-ethyl-butyl-1,3-propanediol, 2-ethylyl-1,3-hexanediol, and hexylene glycol, polytetramethylene glycol provides a starting polyol which is particularly useful in the practice of this invention. A further useful polyol is polybutadiene capped with hydroxyl groups. Polyalkyleneether glycols such as polyproplylene glycol, provide urethanes with the greatest degree of flexibility, while polyhydrocarbon glycols, such as 1,4-bytanediol provide a degree of intermediate flexibility. Use of a thioether glycol, such as thiodiethanol imparts increased solvent resistance to products formed from said thioethers.

Also contemplated in the practice of this invention are polyester-polyols such as those available under the tradename "Multrathane" and polyester-polyethers available under the trade designation "PCP" to form the urethane materials of this invention. The polyols are reacted with a substantially stiochiometric amount of polyisocyanate in the presence of a catalyst to form the well known urethane linkages.

Representative isocyanates include methylene diisocyanates, as well as 2,4-tolyene diisocyanate, 4,4' methylene (di-p-phenylene) diisocyanate; 4,4'-diphenylene diisocyanate; 2,6-tolyene diisocyanate, m-phenylene diisocyanate; 1,5'naphthylene diisocyanate, durene diisocyanate, xylene diisocyanate 1,8-nyphthalene diisocyanate 4,4'-oxy (di-p-phenylene) diisocyanate; 4,4'-thiooxy (di-p-phenylene) diisocyanate; 2,2'-dichloro-4,4'-methmethylene (di-p-phenylene) diisocyanate; bis (4-isocyanatophenyl) sulfoxide. Mixtures of two or more diisocyanates may also be used.

Mixtures of the diisocyanates with organic trior higher isocyanates can be used in the practice of this invention where the resulting mixture has an average isocyanate functionality of at least about 2.00. Examples of suitable tri or higher isocyanates are the polyaryl polyalkylene polyisocyanate as described in *Encyclopedia of Chemical Technology*, Kirk & Othmer Vol. 12, pp. 46,47, Interscience Pub., (New York 1962).

The third component of the urethane portion of the inter penetrating polymer system of this invention is a co-curing agent which has an aromatic portion. One of the best known aromatic curing agents for use with urethane systems is 4,4' methylene bis-(o-chloraniline) available and commonly known as "MOCA". MOCA is an excellent aromatic co-curing agent for urethane systems and urethane systems cured using MOCA have good flexibility, and temperature retention properties. Because of its properties, MOCA must be used with extreme caution; however, there are also presently available other derivatives of MOCA and similar aromatic compounds which provide acceptable urethane curing agents.

Other examples of aromatic co-curing agents useful in the practice of this invention include trimethylene glycol di-p-aminobenzoate available under the trade name "Polacure" from Polaroid; methylene dianiline (MDA); blocked methylene dianiline available under the trade name "Caytur-21", from DuPont, hydroquinone di-($\beta$-hydroxyethyl) ether, (HQEE); and phenyldiethanol amine available under the trade name "Cyanocure" from American Cyanamide.

The resin system of this invention has a second polymeric material which has a different reaction system, backbone and catalyst. It is preferred in the practice of this invention to keep the two reactions as separate as possible. In general, the urethane reaction of the isocyanate and polyols of this invention will proceed immediately upon mixing and will slowly continue as the resin mixture ages. The urethane phase of this multi phase system gives the system its high tear resistance and toughness. The second phase (polyester, vinylester, polystyrene, epoxy or isocyanurate) or a mixture thereof provides good thermal properties. It is preferred that the second resinous component which will be chosen generally from the resin classes of polyester resins, epoxy resins, vinylester resins, phenolic resins, polystyrenes and isocyanurates be substantially non-reactive at room temperature but proceed at an accelerated pace when the resin composition is exposed to the heat and pressure common in compression molding of sheet molding compounds.

Vinylester resins useful in the practice of this invention generally comprise a resin having a bis phenol A backbone capped with a vinyl group or similar unsaturated bond groups. Vinylester resins useful in the practice of this invention can be catalyzed by free radical catalysts such as the well known peroxides or teritiary butyl perbenzoate and similar catalysts well known in the art to provide a polymerized vinylester material.

A second resin useful in the practice of this invention is polystryene. Many of the starting materials and catalysts useful in the practice of this invention are soluable in styrene monomeric material. The sytrene monomeric material can be catalyzed by use of free radical styrene catalyst to form a polystyrene material which provides an inner penetrating network cooperating with the urethane to provide a strong, tear resistant material.

Yet a further class of resins useful as the second component of this invention are the polyester resins which are formed by the reaction of polyglycols and acids to form unsaturated backbone materials. Such materials have a plurality of unsaturated bonds within the material and a free radical catalyst can be used to cause cross-linking of the polyester starting material forming a strong and flexible high temperature resistant co polymer.

A fourth class of resins contemplated in the use of this invention are the well known trimerized isocyanurate systems formed from isocyanate or polyisocyanates terminated prepolymers. Some examples of suitable isocyanates useful for forming isocyanate terminated prepolymers were discussed hereinbefore with the production of the urethane resins.

Isocyanate systems can be catalyzed by the use of teritiary amines, tertiary amine salts and various organo metallic salts all of which are known isocyanurate catalysts to form hi temp. resistant isocyanurate linkages. Isocyanurate systems have good heat stability due to the three dimentional matrix formed by the trimerization reaction of the isocyanates. Many catalysts are known for the preparation of polyisocyanurates. For example, Poly-urethanes Chemistry and Technology, Part I, Saunders and Frisch, Interscience Publishers (1962) page 84 and U.S. Pat. Nos. 2,965,614; 2,979,485; 4,011,063.

Phenolic resins when used as a second resin system in the practice of this invention, provide a system having good physical properties at elevated temperatures. The reactions and starting materials for phenolic resins are well known and the catalyst which catalyzes the urethane system may also be used to catalyze the phenolic system. Under such circumstances, the catalyst would be chosen which cures or substantially cures the urethane at room temperature, to moderate temperatures and which would favor the reaction of the phenolic resin system at an elevated temperature on the order of 250° F. to 350° F.

A sixth class of resins which can be used in the practice of this invention are the well known epoxy resins such as those formed on the reaction of diglycidylether compounds. The epoxy resin systems can be cured using anhydrides or Lewis Acid catalysts and will cure to a phase, which has good physical properties at high temperatures, upon the application of the heat and pressure commonly used for sheet molding compounds.

Resin systems of this invention will contain a fibrous reinforcement or a filler which will increase the tear resistance of the resinous material. One example of a suitable reinforcing material is glass fibers, such as chopped glass fibers or if desired, glass woven sheets or continuous fibers layed as a continuous strand. The glass fibers would be impregnated with the combined resins system. The room temperature curing of urethane portion of the system would provide a handlable sheet. The sheet can be cut to the desired size, placed in a compression molding apparatus, and cured using standard compression molding techniques.

A wide variety of reinforcing fibers are available for use herein and carbon fibers, sisal fibers, kevlar fibers, asbestos fibers, cotton fibers, and other fibers such as steel fibers and whiskers, boron fibers and whiskers, and graphite fibers and whiskers. In addition, a wide variety of organic fibers may be used provided the resins do not substantially degrade the fibers. Glass fibers are the most desirable fibers for most applications because of their low cost and high strength.

Fillers may be used, if desired, and generally are added to the uncured composition to reduce overall material costs without sacrificing a significant degree of desirable physical properties in the final product or to impart specific properties to the compound. Many different types of fillers can be used such as inorganic fillers, e.g., silicate, asbestos, calcium carbonate, mica, barytes, clay, diatomaceous earth, microballoons, microspheres, silica, and Fullers earth; and inorganic fillers, such as wood flour, cork dust, cotton flock, wool felt, shredded cornstalks, and ground nut shells.

In general, when processing sheets of this composition the sheets will be compressed under pressures of 500–1500 pounds per square inch of pressure and a temperature of approximately 200°–350° F. The temperature and pressure will generally be maintained for a time to substantially cure resin to a handlable condition depending upon the thickness of the component being formed and the cure rates of the various resins.

The urethane component of the resin material used in the practice of this invention will be normally present in the amount of approximately 25% to 75% by weight of the final product. The second resinous component will be present in an amount of approximately 15 to 25% by weight of the final product and the fiberous filler material comprising glass or other fiberous material will be present in the amount of approximately 10–50% by weight of the final product.

Various alternations and modifications of this invention will become obvious to those skilled in the art without departing from the scope and spirit of this invention and it is understood that this invention is not limited to the illustration and embodiment set forth hereinbefore.

What is claimed is:

1. A track pad for a track laying device having an endless track of articulated metal track shoes, said pad being adapted to be held within a track show with one face exposed to prevent contact between the metal track shoe and the road over which the track is moving, said track pad comprising: a first urethane resinous material formed by the reaction of an isocyanate terminated prepolymer having an isocyanate functionality greater than 2 and a polyol, said urethane reaction being catalyzed by an oramatic co-curing agent said curing agent having the capacity to immediately begin catalyzing the isocyanate terminated prepolymer at room temperature to a solid material and continuing to catalyze the urethane reaction at room temperature as the resin mixture ages; a second resinous component chosen from the class consisting of polyester resins, epoxy resins, vinyl-ester resins, phenolic resins, polystyrene resins and isocyanurates separate and distinct from said urethane component, said second resins system being adapted to cure only when the second resin reaches a curing temperature of about 200°–350° F. and being substantially unreactive with said urethane resin so that curing of said resins produces an interpenetrating resin matrix and a fiberous filler material in the resin matrix.

2. The track pad of claim 1 wherein said fiberous filler is glass fiber.

3. The track pad of claim 1 wherein said resin further includes a particulate filler.

4. The track pad of claim 1 wherein the fiberous filler material is a woven glass fiber.

5. The track pad of claim 1 wherein said urethane resinous material is formed from isocyanate precursor with an isocyanate functionality of at least 2.0.

6. The track pad of claim 1 wherein said co-curing agent is 4,4' methylene bis-(o-chloraniline).

7. The track pad of claim 1 wherein said second resinous component is a polyester resin.

8. The track pad of claim 1 wherein said second resinous component is an isocyanurate.

9. The track pad of claim 1 wherein said first urethane component comprises about 25 to 75% by weight of the final product; the second resinous material comprises about 15–25% by weight of the final product and the fiberous filler material comprises about 10–50% by weight of the final product.

* * * * *